«12» United States Patent
Landau

(10) Patent No.: US 7,039,522 B2
(45) Date of Patent: May 2, 2006

(54) SYSTEM FOR GUIDING VISUALLY IMPAIRED PEDESTRIAN USING AUDITORY CUES

(76) Inventor: Steven Landau, 330 W. 38 St., Suite 120 A, New York, NY (US) 10018

( * ) Notice: Subject to any disclaimer, the term of this patent is extended or adjusted under 35 U.S.C. 154(b) by 0 days.

(21) Appl. No.: 10/706,733

(22) Filed: Nov. 12, 2003

(65) Prior Publication Data
US 2005/0099291 A1 May 12, 2005

(51) Int. Cl.
*G01C 21/00* (2006.01)
*G08B 1/00* (2006.01)
(52) U.S. Cl. .................... 701/211; 701/300; 340/539.11
(58) Field of Classification Search ................ 701/211, 701/300; 342/357.17, 357.09; 340/539.11, 340/539.23
See application file for complete search history.

(56) References Cited

U.S. PATENT DOCUMENTS

| | | | | |
|---|---|---|---|---|
| 4,660,022 A | * | 4/1987 | Osaka ..................... 340/384.3 |
| 4,797,671 A | * | 1/1989 | Toal, Jr. ................. 340/825.49 |
| 4,935,907 A | * | 6/1990 | Friedman ..................... 367/118 |
| 5,032,836 A | * | 7/1991 | Ono et al. ............. 340/825.71 |
| 5,144,294 A | * | 9/1992 | Alonzi et al. .......... 340/825.49 |
| 5,508,699 A | * | 4/1996 | Silverman ................... 340/944 |
| 5,642,303 A | * | 6/1997 | Small et al. ................ 708/109 |
| 5,806,017 A | * | 9/1998 | Hancock ..................... 701/209 |
| 6,097,305 A | * | 8/2000 | Im et al. ................ 340/825.19 |
| 6,497,367 B1 | * | 12/2002 | Conzola et al. ........ 235/462.45 |
| 6,574,549 B1 | * | 6/2003 | Cato et al. .................. 701/200 |
| 6,580,368 B1 | * | 6/2003 | Jacobs ................... 340/539.11 |
| 2004/0030491 A1 | * | 2/2004 | Hull ........................... 701/207 |

* cited by examiner

Primary Examiner—Michael J. Zanelli
(74) Attorney, Agent, or Firm—Ted Sabety, Esq.; Sabety & Associates, PLLC

(57) ABSTRACT

A system that provides a means for blind or visually impaired people to navigate through a complex environment using auditory cues. Two-way transceiver devices, held by the person, connect through a communications network to a computer system. The computer system activates appropriate auditory signals that are output from audio beacons located throughout the environment based on input provided through the transceiver. Additional interactivity can be incorporated into the system by means of the computer system.

28 Claims, 3 Drawing Sheets

SYSTEM FOR GUIDING VISUALLY IMPAIRED PEDESTRIAN USING AUDITORY CUES

BACKGROUND AND SUMMARY OF THE INVENTION

The object of the invention is to provide a means for visually impaired people to navigate through a complex environment using auditory cues. The invention uses computer telephony, and it incorporates a network of wireless environmental audio beacons that can be triggered by users wishing to travel to selected destinations. The invention also is useful for sighted people who are in environments where visual cues are difficult to obtain or where their visual acuity is constrained. In one embodiment, an installation of the invention is made in a museum to provide auditory navigation of an exhibit for blind or visually impaired attendees. The navigation system also incorporates customized audio descriptions as well as interactivity with the system through a portable transceiver, for example, a cellular telephone handset keypad, earphone and microphone as the user interface.

Introduction

Often visually impaired people are required to navigate physical spaces where typical navigation techniques, for example, the use of canes and memory, are inadequate. In addition, people with sight are often placed in environments where they either cannot see or their vision is impaired, but must nonetheless navigate through the physical space. The invention is directed toward a system that uses audio beacons to provide auditory cues to the person navigating the environment. The system uses a network of audio beacons that are triggered by means of electronic devices held by the user. In one application, the invention is embodied in an electronic system that makes physical spaces, like museums, more accessible to visitors who are blind, visually impaired, or otherwise print disabled. In that embodiment, visitors navigate the exhibit space using their cell phones in order to interact with the system, independently choosing which exhibit components to move to and when they reach a destination, listening to audio descriptions of the relevant exhibit content, and triggering local events within the exhibit. Other applications are contemplated, including use of triggered auditory cues to indicate routes through physical spaces where there is no lighting or vision is otherwise impaired. Further, the sound of the auditory cues can be selected by the user. Advanced interactivity is also possible, whereby the location of a person is automatically detected and the auditory cues or other auditory stimulus automatically triggered.

DETAILED DESCRIPTION OF THE PREFERRED EMBODIMENTS

Background

Figure 1:
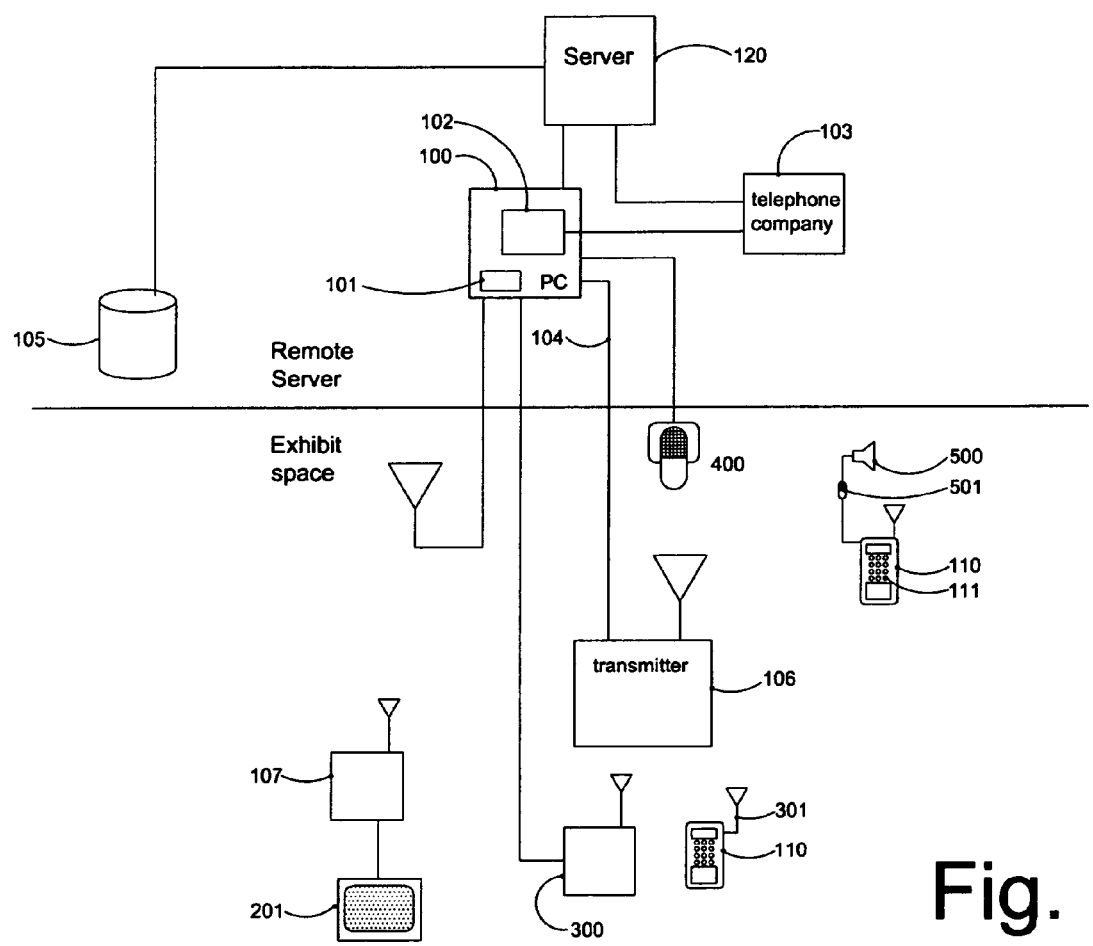
FIG. 1: A diagram illustrating the components of the system and their interconnection.

The system incorporates the following components (see the diagram in FIG. 1):

A computing device (100), like a personal computer or the equivalent, with the capability of operating telephone calls automatically or, as explained below, some kind of data networking connection. In the preferred embodiment, the computer contains an expansion card (102) that provides computer telephony functionality and connects the computer (100) to the telephone system (103). This device senses rings, picks up and then senses audio as well as generates audio onto the telephone line. Practitioners of ordinary skill will recognize that a variety of stand-alone devices can be used for the equivalent functionality. The practitioner of ordinary skill will also recognize that instead of telephone network connections, other kinds of data networking between the handset held by the user (110) and the system (100) may be used, for example, wireless data networking. In this case, the computer would connect to a networking system (104) that had a wireless data transmitting and receiving capability. Another embodiment would be radio signals that have an addressing function to specifically select one of the user devices out of a set, either by digital address or selection of radio frequency itself.

A software application, which can be created in part by using a voice mail authoring system, shall reside on the computer host (100). The software controls the system, and manages all user interactions and data collection. In the preferred embodiment, all voice messages are pre-recorded human speech (not computer text to synthetic speech) for good comprehension of potentially complex descriptions and instructions. These pre-recorded messages are stored as data in the computer memory, its disk drive or in devices that can be accessed by the computer (105). However, as computer generated speech improves in quality, the computer host may replace some or all of the pre-recorded human speech messages with automatic text to synthetic speech functionality. This functionality can also be installed in the handset device, so that the computer delivers text and the handset converts it to speech.

Figure 2:
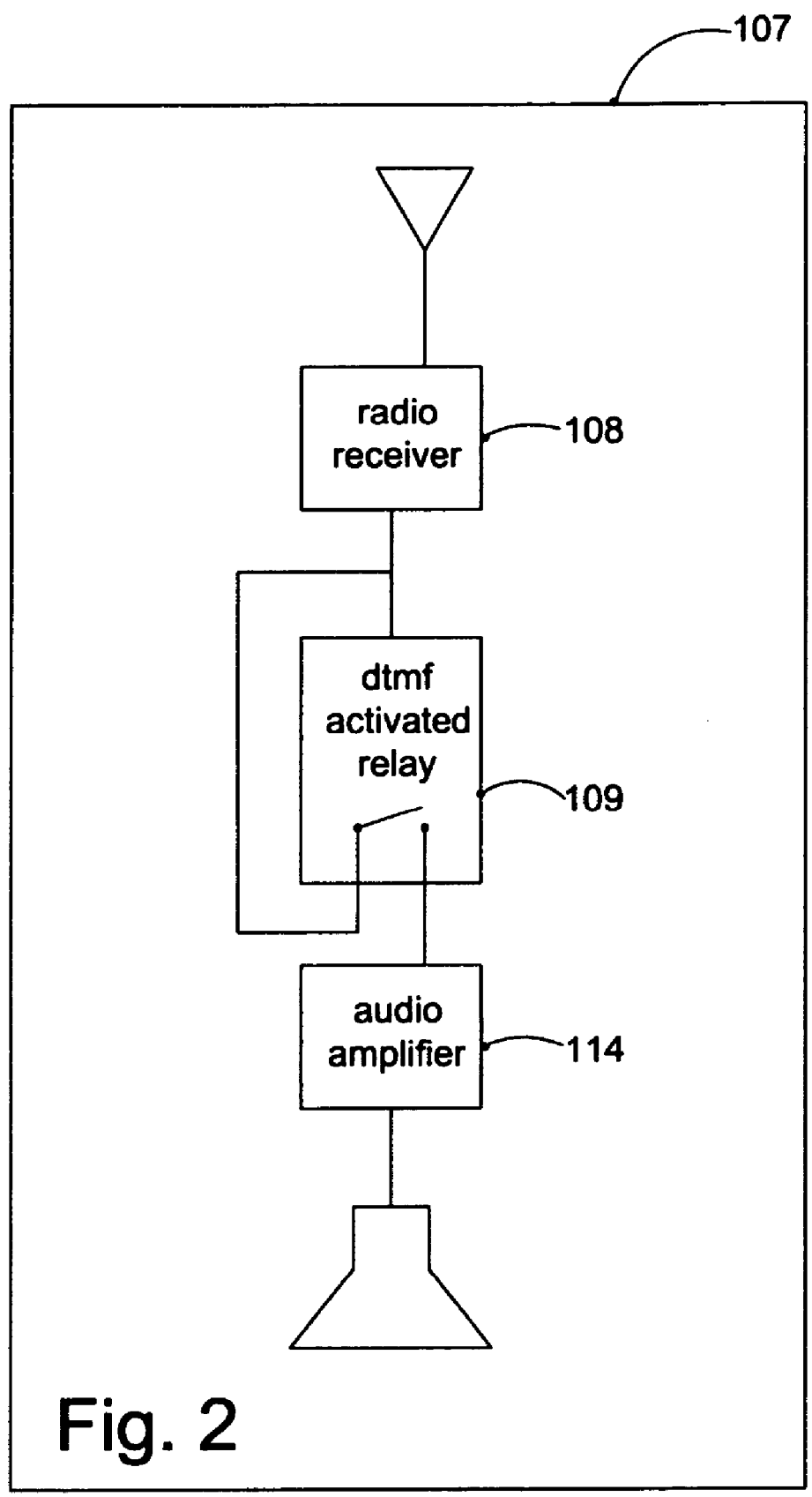
FIG. 2: Detailed illustration of components of an audio beacon using a radio receiver.

The computer (100) is also equipped with a low-power radio transmitter that is connected to the computer's audio output. This device transmits over local radio the audio generated by the computer. Practitioners of ordinary skill will recognize that the equivalent system can be constructed where the audio is transmitted as digital data over a wireless or wired data network to each audio beacon (107). As shown in FIG. 2, the system includes at least one audio beacon (107) which is capable of receiving signals from the low-power transmitter (106). In the preferred embodiment, there is one beacon for each destination or set location on the way to a destination. However, beacons can be placed arbitrarily in the environment to indicate passage, hazards and other aspects of the environment. In one embodiment, the beacons (107) contain: A radio receiver (108) tuned to the same frequency as the transmitter (106); A dial-tone multi-frequency (DTMF) activated relay (109) placed in-line with the audio output from the receiver (108). This device detects the tones generated by the audio output of the computer that are transmitted. When the DTMF detector in a specific audio beacon (107) detects the encoded string of audio tones that uniquely identifies it, it will close a circuit between a loudspeaker and an audio amplifier housed within the beacon (107). At that point, the computer (100) then transmits the audio cue sound corresponding to the user requesting the navigational fix. Practitioners of ordinary skill will recognize that instead of using a DTMF to detect audio tones that uniquely select each destination audio beacon, a data network can be used where each audio beacon (107) has a unique numerical address or identifier. The data network could be wireless 802.11 standard or a wired network like Ethernet. Audio can be directed to the output of the audio beacon (107) by the computer (100) transmitting data that is uniquely addressed for such audio beacon (107) which would include what sounds to generate through the loudspeaker, or alternatively, would provide an index specifying which one of a group of sounds stored in the audio beacon device to play. In the former case, the audio can be delivered as an analog signal, where the sound is rendered at the output of the computer, or as digital data whereby the audio is rendered by the audio beacon itself (107). In the latter case, the computer system (100) can download into all of the beacons (107) the library of auditory cues to select from.

In one embodiment, the user holds a wireless interactive device (110), which, in the preferred embodiment is a cell-phone. Practitioners of ordinary skill will recognize that there are a wide variety of hand-held computer devices that may be used to provide interactivity between the computer (100) and the user. In another embodiment, these devices, rather than communicating over telephone networks with the computer (100) may be wireless hand held computers that communicate using a wireless data network, for example, the 803.11(b) or "Wi-Fi" standard network protocol. In the preferred embodiment of the system, user interactions typically follow these steps:

At least one user, using the cell phone (110) calls a pre-determined telephone number in order to begin the session. Equivalently, a special purpose hand-held device can provide an access activation function.

The user listens to audio delivered through the device (110), and makes user interface menu selections that command the software based on the spoken menu options that are rendered by the computer and delivered back to the device by any of the means described above. The selections can be made by pressing the keys on the cell phone or by means of voice recognition functionality or any other kind of actuation of the device (110).

The user chooses from at least one choice, a sound that will be output by the audio beacon (107) as a navigation audio cue specific for that user. In the preferred embodiment, audio cue sounds are designed to be easy to use for determining direction and distance while at the same time not distracting or annoying to other museum visitors. Once selected, that sound is removed from the catalog of available cue sounds offered to the next user who accesses the system. If user is accidentally logged off the system, s/he may be automatically reassigned the same sound after logging back on. In an alternative embodiment, the hand held device may contain the pre-selected sound the user prefers. Then, the computer (100) can receive the sound as a digital file over the network. If the same sound is being used in the same environment, the collision avoidance procedure is used, as explained below. A variation on this solution is that an index indicating the identity of the desired sound is sent, or the user's identification number indicates to the computer what the desired sound is. A further variation on this embodiment is to include a text to speech system in the handheld device. Then, the computer can either send text or reference stored text in the device, which is then converted to audible speech by the handset itself.

The user can also select a destination in the environment through the interactive menu. In the preferred embodiment, the user selects a destination in the museum exhibit that is of interest to them from a list of possible places. The destination has a unique audio beacon (107) placed in close proximity to it. The computer determines the selected destination through the operation of the interactive menu.

The user navigates by pressing a key (111) on the handheld device (110) which then transmits to the computer (100) (either by the telephonic, data or radio network) the request for a cue sound to be generated. The computer (100) determines which user made the request by determining which telephone line corresponds to the user. Alternatively, the use can be identified by the data network address indicated in the data packets transmitted by their hand-held device (110). The computer (100) determines which destination audio beacon (107) has been selected by such user. The computer then outputs a series of audio tones corresponding to such beacon (107) which are transmitted over the radio (106). The radio receivers in all audio beacons (108) receive the signal. However, only the audio beacon corresponding to the selected location activated. When the DTMF activated relay in the audio beacon (109) detects the corresponding tone sequence, the circuit through its audio amplifier (109) is closed. The computer (100) then transmits the cue sound corresponding to such user (106), which is then output from the loudspeaker of the audio beacon by means of the audio amplifier. The user listens for their cue sound, and makes their way towards the destination, triggering the cue sound as needed to assist them in their navigation. In an alternative embodiment, the computer (100) can periodically cause the audio cue sound to be output from the same beacon (107) until the user confirms they have arrived. In another embodiment, the computer can automatically detect the location of the user and update which beacon will respond to the user's actuation. Since the sound only occurred at the same or very close to the same instant that the phone key was pressed, it is quite easy to listen for, and to get a fix on the sound, even over the din of a crowded exhibit floor.

In an alternative embodiment, the computer (100), hand held device (110) and beacon (107) can be connected by a data network. Similarly, a cell phone embodiment of the device (110) can connect through a public telephone network to the computer (100), and the computer communicate with the beacons (107) through the data network. In this embodiment, the invention includes a series of antennas placed in the facility through which the wireless handheld devices communicate with the computer (100). Practitioners of ordinary skill will recognize that the term "handheld" is a term of art to mean a portable computing device often held in the hand, but alternatively placed in a pocket, bag or carried in a sling hung from the body of the user. The user holds a hand-held device (110) with wireless network connectivity. In this configuration, when a user activates a session, the handheld device has a unique logical address on the network that is then stored by the computer (100) in a manner that logically links it to such user. When the user actuates the device (110), whether by pressing a key or by voice command or any other means, the device (110) transmits a data packet over the wireless network to the computer (100), which then can interpret the command by examination of the contents of the data packet. In an alternative embodiment, voice commands from the user can be transmitted as digital audio data to the computer (100) and the command interpreted there. Additionally, the computer (100) can transmit audio data, for example specific instructions, to the device (110) which are then rendered by the device (110) into analog audio for the user to listen to.

Figure 3:
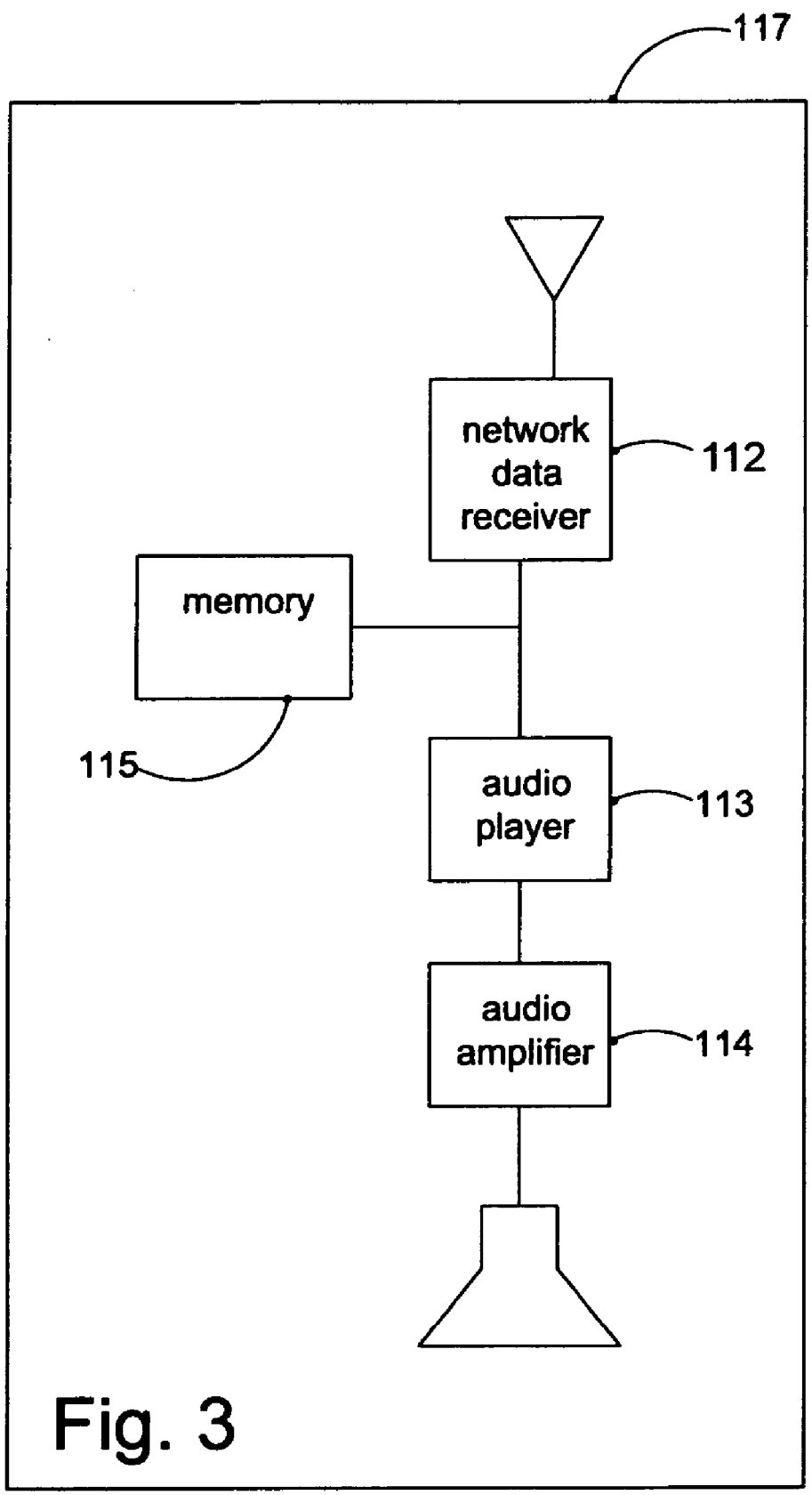
FIG. 3: Detailed illustration of components of an audio beacon using a network data receiver.

Similarly, as shown in FIG. 3, each beacon (117) are each assigned a unique data network numerical address number, for example, an IP (Internet Protocol) address. If the computer is to cause an audio cue to be played by a specific beacon, for example, the wireless network transmitter (106)

would send out data packets to the beacons (117) which logically addressed the specific beacon as required. Each beacon will have a unique logical address (112). In this embodiment, the computer sends a data packet onto the network that has the same logical address as the audio beacon designated by the user. All audio beacons (117) can receive the data packet, but the audio beacon (117) that has a matching logical address will be activated. The data packet contains the cue sound corresponding to the user, as determined by the computer (100). Alternatively, the data packet can contain a logical reference to the cue sound, which can be stored in the memory of the audio beacon (115). That logical reference determines which cue sound the audio beacon emits once it decodes the data packet. In another variation, the computer (100) can send digital audio data to the beacon (117) to be played back. The microprocessor in the audio beacon would generate the audio output by referencing the appropriate sound indicated in the incoming data packet and accessing a library of audio cue sounds that are digitally encoded and stored in a local computer memory device (115), including digital audio data that is delivered as part of the command protocol that issued from the computer (100). This is then amplified and output through the loudspeaker (113, 114). In summary, the practitioner of ordinary skill will recognize that the data network provides functionality that when the user actuates a key, or makes voice command into the device, the appropriate command encoded as a data packet is transmitted to the computer (100) through the wireless antenna, or when the computer causes a sound to be emitted by beacon, or some other event to occur, the computer sends a data packet over the data network to the appropriate beacon (117) or other device it is controlling.

When the user arrives at the destination (200), they can indicate their arrival by pressing a different key (111) on the cell phone or other hand-held device (110), or by any equivalent actuation, at which point the computer will transmit to the device (110) the audio program corresponding to the point in the exhibit. This may include, for example, a discussion of the concepts being presented, a description of the physical layout of the exhibit and directions for interaction or navigation through the environment. Also, if the exhibit offered interactive experiences or optional information that had to be requested, this may be accessed by the user by pressing appropriate keys on the device (110) to trigger local events. For example, with exhibits involving a video screen (201) offering additional information, finding a place on a touch screen to press to launch it would be impossible for a blind visitor. By use of the invention, once the video is started, the device (110) offers private synchronized audio description of the action taking place on the screen.

When the participant is preparing to move on to the next activity, or to exit the exhibit, the system may play through the cell phone or device (110) a list of destinations. Using the interactivity, (whether by pressing the key pad or voice activation) the user selects a destination. The destinations can be organized and presented to the user from nearest to farthest. Once the destination is selected, pressing the navigation key causes the same audio cue sound to be output from the audio beacon corresponding to the new destination. If the new destination is very far away from the current position, the computer will provide interim destination locations, like a stepping-stone path that indicates to the user how to follow a progressing chain of audio beacons that lead to the final destination (as described below). At the same time, the user can indicate arrival at each interim destination by pressing a designated key on the phone, or otherwise actuating the hand-held device (110). The practitioner of ordinary skill will recognize that similar key actuation on wireless devices or even voice activated interaction may be used as well.

Multiple Simultaneous Users. From a technical point of view, there are no significant obstacles to accommodating multiple users; computer telephony-based call center equipment and software is designed to handle vast numbers of simultaneous interactions. In addition, wireless networks make it possible to have multiple simultaneous interactions with the system. Each wireless handheld device can have a unique network address, much as each cell phone has a unique telephone number. Practitioners of ordinary skill will recognize that either provides equivalent connectivity from the user's handheld device to the system. Practitioners of ordinary skill will also recognize that data network latency, or the delay between the user prompting the cue and its emission by the system require must be sufficiently minimized in order to be practical.

Another aspect of the invention includes functionality to address collisions when a specific beacon (107) is the destination for multiple users. In such a case, the only time when pressing the key or otherwise actuating the device (110) does not cause the audio cue sound is when another user's cue sound was currently playing through the same beacon (107). The user whose sound is blocked must re-actuate the device (110) to cause their cue sound to play. In a variation of this solution, the blocked audio cue can be played back as soon as the first one is completed. Practitioners of ordinary skill will recognize that a period of silence between the two sounds may be set as necessary to increase perceptibility.

Steppingstone routes. One of the most interesting and powerful possibilities for the system described here, is that multiple step routes could be followed to destinations that are far away from a user's current position. Assume, for example, that the visitor to the museum has just finished studying the mineral exhibits on the first floor, and wants next to move to the dinosaurs on level four. If the entire museum were outfitted with beacons, it is not difficult to imagine that the system could first guide the user to a nearby elevator, and instruct the user to go to the fourth floor. When the elevator door opens upstairs, the user could listen for his or her cue sound, and, continue to the dinosaurs in similar fashion. The system may be combined with a positioning system so that the appropriate cue sounds are made as the system detects the location of the user. Alternatively, the user can confirm their arrival at a beacon's location by pressing keys on the telephone, or equivalent methods of interactivity. In addition, the system can automatically determine the presence of the user at the interim destination by means of electronic proximity detectors, including, without limitation, radio frequence identification devices or other means of position determination.

Organizing Stepping Stone Paths. The program controlling the stepping-stone operation includes a database of route sequences that could connect any starting point to any finishing point. The route sequence is the sequence of audio beacons that lead the user from their location to their selected destination. Given a large facility, that suggests a very large number of potential routes. However, since the computer knew the starting point for any given journey (if they used the invention to get there originally, or if at the entrance to the environment or by means of location detection), the task of selecting an appropriate route is not very difficult. When the system is set up, the location of all beacons (107) are stored in the computer (100). The program (101) calculates the travel distance between each possible pair of beacons, taking into account the layout of the facility. The system determines what the shortest possible route between each pair of beacons is and stores the route as an entry in the database stored on the hard drive of the computer. When a user calls to initiate movement from one beacon to another, the database entry corresponding to the selected pair of beacons is referenced by the system to provide the appropriate route.

The invention organizes the destinations in a manner that they are presented to the user in sequence from nearest to farthest from the user's present position. This provides information to the user to simplify the task of choosing where to go next. For example, even if an exhibit sounded especially interesting, if it was near the end of a long list, the user can choose a destination that is closer, and plan to travel to the other destination later in the visit. In addition, the user may select a group of destinations and the computer can then calculate the shortest route required to visit all of the them. The ability to plan a route is thereby promoted by this simple mechanism. In order to determine the sequence in which to present the destinations from any given starting point, a database is constructed as part of the software (101), for example a database in Microsoft Access, that lists every possible combination of starting and end points for a journey. The listing of end points for each starting location appears in the database sorted from nearest to farthest. When a starting point and desired destination are entered into the system, the program (101) queries the database for a given start point, then proceeds to load end points into the list presented to the user by moving down to the next entry until the set that corresponded to the start point was exhausted. Once the user has listened to the listing of all destinations that are available from their current location, they are prompted to press or say the number or name that corresponds with their selection's position in the list. Then, the computer again queries the database to determine the most direct route to that place.

For a large set of possible starting points and destinations, the computer (100) can calculate its determination of the shortest route among the selected destination points once the selection is made, rather than attempting to calculate all of the possible routes in advance. Practitioners of ordinary skill will recognize that determining the shortest route among a set of destinations is a form of the well-known "Travelling Salesman Problem", for which a wide variety of algorithms exist to provide solutions. Once the requested route sequence is determined, it is stored in the memory of the computer (100) so that the computer can then function in accordance with another aspect of the invention, the stepping-stone path finding process described above.

Finding a User's position: In some cases, the system has to determine where the user is located in order to orient the user and the software (101). To accomplish this, the system can play in sequence the user's attractor sound from each of the beacons arrayed in the environment space or along travel routes in the vicinity of the last known location of the user. As the sounds are played, the cell phone (110) can announce corresponding numbers. The user is prompted to press the phone number key that corresponded to the beacon that sounded the loudest, or say the number:

Then, the computer causes the hand-held device (110) to announce the name of the location where that beacon is located. If the user is near but not at that location, he or she is instructed to press or say a command to hear their cue sound from that location again, and to walk toward the destination, repeatedly actuating the device (110) as necessary to hear and follow the sound. The use is prompted to actuate an arrival command once the beacon is reached. Then, the computer updates its data set so that user's current position information matches the beacon that he or she has arrived at.

In another embodiment, the system can detect the location of the user automatically by means of proximity detection of the hand held device (110) to the beacons (107) or proximity detection by a number of detecting devices distributed about the environment. Proximity can be detected in a variety of ways. For example, the use of Radio Frequency Identification (RFID) technology can be used to automatically detect the presence of a user. Reference is made to the international standard ISO/IEC JTC 1/SC 31. The hand-held device or cell phone (110) can contain a unique RFID device (301), or can otherwise properly interact with RFID equipped transmission equipment. Alternatively, the RFID device (301) can be provided to the user separately when they visit the environment so as to protect their privacy by making the correspondence between its identity and the identity of the user temporary. In such an embodiment, the position detectors (300) can be connected to the computer (100) by means of a data network, where each detector has a unique logical address and a pre-determined location. As the user, holding the RFID equipped device (301), passes by the detector (300), the detector will detect the presence of the device (301) by means of the RFID signals. At that instant, the receiver can send a message to the computer (100) indicating the presence of such user. The computer (100) recognizes the location by virtue of the correspondence between the identity of the detector (by means of logical addressing) and the pre-determined location. The computer (100) can continuously maintain a list of users and their last known location.

Sound Design: An important aspect of the invention is the design and creation of the audio cue sounds that are issued from the audio beacons. The design of the sounds must take into account acoustic perception in the environment where the system is set up. Past research into the question of spatial auditory perception has been conducted. The invention provides advantage over some existing way-finding systems in that relative distances between the user and various destinations are easy to comprehend. An important aspect of the cue sound design is that they should unobtrusive: many people complain about the audible street crossing signals that have been installed in some cities, because of the repetitious, relentless nature of the sounds (Gallagher and Montes de Oca, 1998). This problem is largely mitigated by the invention because the sounds are played when one or more user user is present, and then the sounds are played irregularly, and only for short periods during travel to destinations.

Cue Volume: Another aspect of the invention involves the volume of the cue sounds. Since some users might have some hearing loss, and since ambient noise levels are unpredictable, there is an advantage to offering the user a volume control for the Ping sounds. Alternatively, the volume levels for both the environmental attractor sounds and the phone narration can be dynamically adjusted in response to ambient noise in the exhibit space. To accomplish this, one or more microphones (400) placed in the environment space will be used to capture audio levels at at least one location, and this information will be input to the computer, so that the volumes of output sounds can appropriately adjusted depending on where the user is and the amount of local ambient noise around the user. For example, as the user passes into an area with higher ambient noise, the computer (100) can control the beacon in that area (107) to increase its volume as a function of the detected ambient noise. Conversly, in a quiet area, the volume of the beacons can be automatically lowered. This technique will ensure that attractor sounds are audible in noisy conditions, or conversely, so that the attractor sounds do not cause unnecessary feelings of self-consciousness for the user in quiet or contemplative settings.

Actuating the system by speech recognition. In another embodiment of the invention, the key pad actuation by the user can be supplemented or replaced by voice commands. Currently, affordable speech recognition software, such as Nuance 8.0, can distinguish a small vocabulary of words; numbers from zero to nine, and the words "yes" and "no", can be recognized for a wide range of English speaker, and are generally adequate to implement the basic interactions. By incorporating such a software module (502) into the computer (100), the invention can be operated either by pressing buttons on the phone or by speaking the numbers into a hands-free type phone, like those that include an earpiece (500) with a microphone (501) mounted in-line on a cord leading back to the phone, which could be hanging from a neck cord, or even in the user's pocket. The practitioner of ordinary skill will recognize that as computer voice recognition software improves in tandem with increasing compute power of portable devices, it is equivalent for the voice recognition capability (502) to reside in the cell-phone or hand held device (110).

Feasibility of off-site location for system server. In the preferred embodiment, the computer (100) that controlled all user interactions was located in the museum; however, there were good reasons to consider maintaining the server computer remotely. Significant economies of scale are possible if a central call or network handling computer (120) is housed in a centralized facility that can handle many phone calls or network data queries from users at multiple locations, including multiple environments. In this embodiment, all of the functionality of the computer (100) is housed in a remote location and a data network is used to connect the remote central system with the local beacons, exhibits or other devices controlled by the system. In another variation, each environment equipped with the invention would have at least one computer (100) connected via Internet (or any equivalent wide area network) to the central office computer (120). The local computers (100) would simply be responsible for issuing appropriate audio cue sounds, via radio transmitter, to the correct beacons; but all of the content and control programming would be handled centrally. The central computer (120) and the local computer (100) would communicate via data messages indicating which sounds to play or the location of a user or whether to play a cue sound. A variation on this system architecture would have the local computers (100) processing the network traffic between the RFID devices (301), beacons and wireless data traffic from the hand held devices (110). The central computer (120) can be used to handle the cell-phone network traffic. The voice activation system can be housed either in the local computer (100) or in the central system attached to the telephone network (120). Content revision could be done by, for example, staff at the museums, by logging onto a website that permitted them to make changes to the system. For example, if a particular exhibit were closed, the associated beacon and destination choice could be removed from the choices presented to users.

Usefulness of phone-based guides for the general public. A portable telephone based implementation of the invention would be useful for a wide variety of everyday applications where visual impairment is a problem, especially in urban environments. For example, an independent living center for seniors could be outfitted with the invention. Users could navigate from their living quarters down corridors to elevators, from where they could access each floor and the facilities available there. The invention also encompasses the use of the cell phone or handheld device for way-finding to also include other "remote control" operations like, for example, unlocking doors, indicating floor requests in the elevator and an endless range of other tasks that usually require finding and mastering unfamiliar equipment and controls designed for sighted people.

In this embodiment, the user is asked to press a key on the phone, at which point instead of a local beacon emitting a sound, a local computer controlled device is triggered. In the preferred embodiment, the local beacon emitted a trigger over a wire to the local museum exhibit in order to actuate an activity in the exhibit and to produce an audible response for the user.

In another embodiment of the invention, the invention can be deployed in public spaces through the use of publicly accessable information kiosks. A network of public information kiosks, for example, those used to purchase tickets or provide schedule and route information for an urban transit system, inter city rail system or airport could be outfitted with the invention so that such kiosk also operates as user-activated audio beacons. A blind or visually impaired person would use a cell phone to connect to an automated call center, and then select a desired kiosk from a list of locations. The location of the user could be determined based on the cell phone's active cell location or through the use of RFID technology as described above. The user would then press a key on their phone to trigger an attractor sound to issue from a speaker mounted on, in or next to the requested kiosk. Alternatively, voice commands from the user could actuate the system. If the caller was within hearing distance, it would be possible, by deducing the distance and direction from which the sound was heard, to follow the sound to its source. The user could press the button or make the voice command as often as required to guide him or her to the kiosk. In addition, the stepping stone aspect of the invention described above can be used to guide the user. Once he or she had arrived, it would be possible, through the use of a screen reader or other audio output from the kiosk, to interact directly with the kiosk. An automatic volume control could continuously adjust the loudness of the attractor sounds as needed to compensate for high levels of ambient noise, and thereby ensure that the attractor sound could be easily heard from a reasonable distance by a person with normal hearing.

Call attendant. Another aspect of the invention addresses situations when the user is unable to properly respond to the system or otherwise is unable to progress. In this case, the user can press key or actuate the device (110) so that a "Call attendant" function is initiated. At this point, the computer transfers the call to an outgoing phone line and places a call to a designated member of the nursing home staff or some other personnel.

Other aspects of the invention include:

Mounting beacons on walk/don't walk signs, so that users can navigate their way through complex street intersections, where the beacons are activated in such a way that the user crosses the thoroughfare safely. For example, the beacons can be used by the user determine the location of crosswalks and the invention used to provide cue sounds when the traffic signals are favorable for a street crossing.

Installing beacons on the exterior of buses, trains or other doorways, right next to the passenger door, so that a user can using audible interaction with the system determine which bus or train is the one he or she is waiting for, and then board it independently. In this embodiment, the user can interact with the software (101) in order to be prompted for the desired train or bus. When the bus or train arrives and the doors open, the beacon located next to the door can be actuated.

Placing beacons inside a facility where the user can use a computer to determine the location of an object in the facility, and then use the invention to be guided to that location. For example, the invention can be used to facilitate a user's navigation through a library space, locating stacks, and finding the materials they are in search of.

Including audio instructions in the software (101) that can be, for example, warnings about hazards along the route or other information relevant to the positional context the user is in within the environment. In the preferred embodiment, when the user is traveling along the steppingstone route from the museum's main information desk to the exhibit entry point, he or she hears a message suggesting that they use caution, because the route includes moving down two flights of stairs.

Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that any of the software components of the present invention may, if desired, be implemented in ROM (read-only memory) form. The software components may, generally, be implemented in hardware, if desired, using conventional techniques.

The spirit and scope of the present invention are to be limited only by the terms of the appended claims.

What is claimed:

1. An auditory navigational system comprising:
   at least one transmitting handheld device with a user interface, where
   the handheld device is one of either a cellular telephone or a handheld computer with a wireless data network capability;
   at least one computer that receives signals from the at least one handheld device; and
   at least one audio beacon controlled by one of the computers where the at least one beacon emits a sound as a result of a user actuating the user interface of the handheld device, such emitting audio beacon being selected by the user as a result of their interaction with the receiving computer using the handheld device.

2. The system of claim 1 where the emitted sound is stored in the emitting audio beacon.

3. The system of claim 1 where such emitting audio beacon is a beacon at one location among a sequence of locations determined by one of the at least one computers to be a route to the selected beacon.

4. The system of claim 3 where the at least one computers causes at least two audio beacons to emit a sound in sequence and stores in computer memory an index representing the identity of the audio beacon that emitted a sound immediately prior to the user actuating the handheld device and before the next beacon in the sequence has emitted the sound.

5. The system of claim 3 further comprising a data memory located in one of the computers wherein the substantially shortest usable route between one pair of the at least one audio beacons is stored in the form of a sequence of indices corresponding to the sequence of audio beacons that lie closest to the substantially shortest usable route between the pair of audio beacons.

6. The system of claim 3 where the approximate locations of the audio beacons are stored in a data memory accessed by the at least one computer.

7. The system of claim 1 where the audible volume of the emitted sound is adjustable so that it is adjusted upward when the ambient noise surrounding the emitting beacon increases from a nominal level or adjusted downward when the ambient noise decreases from the nominal level.

8. The system of claim 1 where the emitting audio beacon does not emit a sound at the request of a second user when it is in the process of emitting a sound at the request of a first user.

9. The system of claim 1 where the emitting audio beacon emits a sound requested by a second user after a sound requested by a first user is completed when the request by the second user is received while the sound of the first user is being emitted.

10. The system of claim 1 further comprising at least one radio frequency identification device with a data network connection with the at least one of the computers.

11. The system of claim 1 further comprising:
    an electromagnetic detector that detects the user's presence in proximity to the detector; and
    a data network that connects the detector to at least one of the computers.

12. The system of claim 1 where the at least one audio beacon further comprises a DTMF activated relay.

13. The system of claim 1 where the at least one audio beacon further comprises a digital data memory device where at least one sound is stored as digital data.

14. The system of claim 1 further comprising a data output connected to the at least one audio beacon that causes a device connected to such output to perform a function referenced by commands encoded as data output by the beacon.

15. The system of claim 1 where actuation of the handheld device is accomplished by spoken voice into a microphone.

16. The system of claim 1 whereby the emitting audio beacon is selected by the user when the user voices a command into a microphone.

17. The system of claim 15 or 16 where one of the at least one computer or the handheld device further comprises a voice recognition system.

18. The system of claim 1 where the handheld device further comprises a text to speech capability.

19. The system of claim 1 where the at least one computer is located in a central location and controls the audio beacons in one or more remote locations.

20. The method of claim 1 where the emitted sound is specific to the user.

21. The system of claim 1, 3, 11, 16 or 18 where the emitting audio beacon is located in close proximity to the pedestrian entrance to a train, a bus, an escalator, an elevator, a hallway, a stairwell, a pedestrian line defined by a crowd control device, the curbside of a roadway crosswalk, the entryway to a library stack.

22. A method of providing an auditory navigational guide to a person comprising the steps of:
- receiving from a user's handheld device an indication of a selected destination from among a plurality of selectable destinations;
- determining the approximate location of the user;
- determining the next audio beacon among a sequence of audio beacons corresponding to a route to the selected destination from the approximate location;
- receiving a request to produce a cue sound; emitting the cue sound from the next audio beacon.

23. The method of claim 22 where the handheld device outputs a verbal description of at least one aspect regarding the route to the emitting beacon.

24. The method of claim 22 further comprising:
- outputting a verbal description from the handheld device of at least one aspect regarding the selected destination.

25. A method of providing an auditory navigational guide to a person comprising the steps of:
- receiving from a user's handheld device comprised of either a cellular telephone or a handheld computer with a wireless data network capability, an indication of a selected destination from among a plurality of selectable destinations;
- receiving a request to produce a cue sound;
- emitting the cue sound from an audio beacon located in proximity to the selected destination where the receiving from a user's handheld device step comprises the operation of an interactive menu where choices are presented as audio output from the handheld device and selections by the user are made by pressing a key pad on the handheld device.

26. The method of claim 25 where the choices include selection by the user of at least one of an airplane flight, bus line, bus line destination, train line, train line destination, office location, exhibit location, floor level, stairwell, elevator, crowd line, ticket line.

27. A method of providing an auditory navigational guide to a person comprising the steps of:
- receiving from a user's handheld device an indication of a selected destination from among a plurality of selectable destinations;
- receiving a request to produce a cue sound;
- emitting the cue sound from an audio beacon located in proximity to the selected destination where the receiving from a user's handheld device step comprises the operation of an interactive menu where choices are presented as audio output through the handheld device and selections by the user are made by speaking verbal commands into a microphone operatively integrated with the handheld device.

28. The method of claim 27 where the choices include selection by the user of at least one of an airplane flight, bus line, bus line destination, train line, train line destination, office location, exhibit location, floor level, stairwell, elevator, crowd line, ticket line.

* * * * *